United States Patent [19]

Puddephatt

[11] Patent Number: 5,345,052
[45] Date of Patent: Sep. 6, 1994

[54] TOOL MAKING

[75] Inventor: Kevin J. Puddephatt, Nr. Olney, England

[73] Assignee: Nissan European Technology Centre Limited, Tyne & Wear, United Kingdom

[21] Appl. No.: 988,681

[22] Filed: Dec. 10, 1992

[30] Foreign Application Priority Data

Dec. 12, 1991 [GB] United Kingdom ............ 9126457.2
Dec. 12, 1991 [GB] United Kingdom ............ 9126458.0

[51] Int. Cl.$^5$ ........................ B23H 1/00; B23H 9/12
[52] U.S. Cl. .............................. 219/69.17; 219/69.16
[58] Field of Search ............. 219/69.17, 69.15, 69.12, 219/69.13, 69.16

[56] References Cited

U.S. PATENT DOCUMENTS

| 3,498,158 | 3/1970 | Kougel ............................ 219/69.17 |
| 3,694,610 | 9/1972 | Saito et al. ...................... 219/69.17 |
| 3,975,608 | 8/1976 | Ullmann et al. ................. 219/69.16 |
| 4,736,786 | 4/1988 | Trumbauer et al. ............. 164/23 |
| 4,952,790 | 8/1990 | Futamura ........................ 219/69.16 |

FOREIGN PATENT DOCUMENTS

| 2700860 | 7/1977 | Fed. Rep. of Germany ... 219/69.15 |
| 3514510 | 10/1986 | Fed. Rep. of Germany ... 219/69.15 |
| 57-8039 | 1/1982 | Japan .............................. 219/69.15 |
| 59-152023 | 8/1984 | Japan .............................. 219/69.17 |
| 60-255233 | 5/1986 | Japan . |
| 61-164718 | 7/1986 | Japan .............................. 219/69.13 |
| 63-115645 | 5/1988 | Japan . |
| 63-169226 | 7/1988 | Japan .............................. 219/69.16 |
| 63-180341 | 7/1988 | Japan . |
| 1007067 | 10/1965 | United Kingdom . |
| 1043174 | 9/1966 | United Kingdom . |
| 1211190 | 11/1970 | United Kingdom . |
| 1322954 | 7/1973 | United Kingdom . |
| 1434344 | 5/1976 | United Kingdom . |
| 2123335 | 2/1984 | United Kingdom . |
| 2159445 | 12/1985 | United Kingdom . |
| 2205513 | 12/1988 | United Kingdom . |
| 2230981 | 11/1990 | United Kingdom . |
| 86/05732 | 10/1986 | World Int. Prop. O. . |
| 88/03452 | 5/1988 | World Int. Prop. O. . |

OTHER PUBLICATIONS

"Rough and Finish Cut Electrodes", IBM Technical Disclosure Bulletin, vol. 12, No. 7, Dec. 1969, by Young.

Krzyzanowski et al., "Verwendungsgerechte Herstrellung von Schaumstoffmodellen," Giesserei, vol. 68, No. 15, pp. 463–467 (Jul. 1981).

Primary Examiner—Geoffrey S. Evans
Attorney, Agent, or Firm—Foley & Lardner

[57] ABSTRACT

A trial tool for injection moulding is made by subjecting a cast Zn alloy tool blank to rapid EDM, using a first electrode and a relatively large EDM gap, to produce a coarse surface closely approximating to the required shape, and then subjecting the coarse tool to slow EDM, using a second electrode and a smaller EDM gap, to produce a trial tool having an operative surface of the required shape. A production tool is then made by subjecting a cast steel tool blank to rapid EDM, using the second electrode, and then subjecting the coarse production tool to slow EDM, using a third electrode.

30 Claims, 3 Drawing Sheets

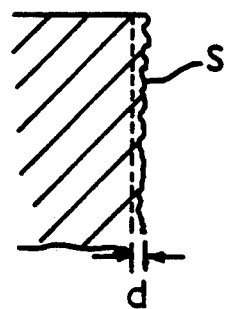
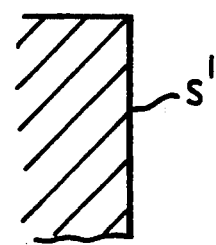
FIG.7a    FIG.7b
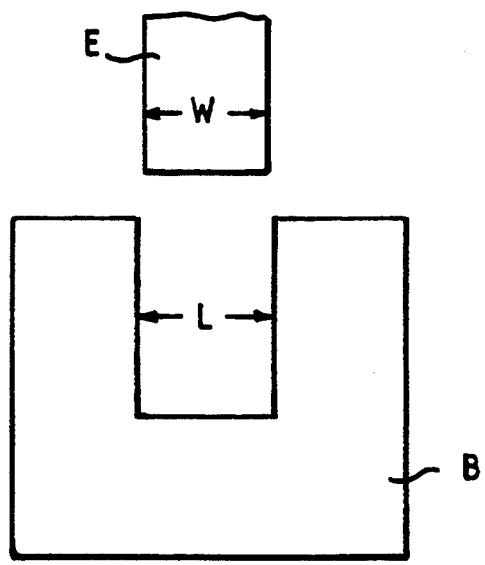
FIG.8

TOOL MAKING

BACKGROUND OF THE INVENTION

1. Field of the Invention

This invention relates to the making of forming tools, in particular injection molding tools such as are used to define one or more surfaces of a cavity for molding a part made of plastics material, e.g. a trim or body part to be used in a motor vehicle.

The term "forming tools" is intended to include without limitation, injection molding, blow molding, press, hot press, and die casting tools.

In this specification the following abbreviations are used:
CAD: computer aided design;
NC: numerical control or numerically controlled, according to context;
EDM: electrical discharge machining.

2. Description of the Prior Art

One known method of making an injection molding tool is by NC machining from a rectangular block of material. For example, to produce plastic parts, such as a bumper of an automobile, this may be carried out according to the following process. A positive master model is made from wood and resin materials which conforms to the shape of the article to be manufactured by the tool. The master model is copied into a metal tool blank using pantographic machining techniques to provide one part of the tool. The positive master model is then provided with a cover layer of a suitable material, typically glass reinforced plastic, which when removed from the master model, provides a "negative" model of the article for manufacture. The negative model will therefore have a surface which has a shape corresponding to that of the article for manufacture. The shape of this surface is then copied into a second metal tool blank also using pantographic machining techniques to provide the cooperating part of the injection molding tool. The tool blanks are usually of aluminum alloy or steel depending upon the number of articles to be produced by the injection molding tool. As will be appreciated from the above process, as co-operating parts of the tool are machined from the tool blanks by NC (numerically controlled) machining, with possibly some finish machining using electrical discharge machining (EDM) techniques, the machining time for large forming tools, such as a tool for injection molding an automotive vehicle impact bumper, can be in the region of two or three months. To this must be added the time taken to produce the wood and resin master model which, as the materials are difficult to work, can take, typically, six to twelve weeks to manufacture. The manufacturing cost of forming tools for relatively large and complex shapes (such as a vehicle impact bumper) is therefore, extremely high and the forming tool can take, in total, nine months to produce if this conventional fabrication process is adopted.

Another known method is to machine the tool from a rectangular block of material, using conventional EDM techniques, which is an extremely time consuming and expensive procedure, often requiring several weeks of continuous EDM machining to achieve the desired shape with the attendant high production costs.

In order to avoid these complicated and time consuming processes, it has, therefore, been considered by the applicant to fabricate forming tools using a casing process in which a tool blank is cast in a predetermined shape which approximates to the final tool shape and an EDM process in which the tool blank is subjected to certain EDM operations.

Casting molds for use in fabricating cast metal shapes are usually produced by forming a slurry of sand or a sand/resin mixture around a casting model. The casting model is placed within a frame and the mixture is compacted into the space between the frame and the model and allowed to set. For large forming tools the sand mixture casting mold must have sufficient inherent strength to support the weight of the cast material, which can be in excess of 10 t. The mixture is therefore compacted around the casting model using high density ramming techniques. In view of the compaction forces required, the casting model must have a sufficient rigidity so as to maintain the desired shape through the compaction process and provide a casting to the required shape and dimensions. Furthermore the metal when cast into the casting mold, may contain casting defects, such as air bubbles, weakening the cast structure. If such defects cannot be rectified the cast is usually scrapped and the casting process repeated. It is desirable, therefore, to produce a casting model which can be used to produce several molds, if necessary. This is particularly advantageous when the desired shape is relatively large and has a relatively complex profile, such as, for example, automotive or 'white goods' parts and body panels. If the casting model is not re-usable, the whole process must be repeated.

To provide a casting model with the required physical characteristics, the master model, fabricated and shaped using wood and plastics resin is usually used as the casting model. As such, the master model can be provided with the desired physical characteristics, but, as stated above, the wood and plastics resin materials are relatively difficult to work and relatively expensive to produce. Furthermore, in the automotive industry, design changes are frequently required for body and trim parts in view of the complexity of part shape and the interaction with adjacent parts. Such design changes in the final shape can be relatively slow to implement when the wood and plastics resin master model is used as the casting model.

It has also been considered to make a casting mold by shaping a body of low density plastics from ("STYROFOAM" trademark) to form a casting model, and forming a mold of molding sand against the shaped surface of the foam model. However, as the plastics foam used is a relatively open cellular structure, the molding sand sets into the surface cavities in the foam material, binding the casting model quite firmly to the sand mold. The low density foam casting model must therefore be left in place and allowed to burn out during the casting of the hot metal. This has a severe disadvantage in that toxic fumes, including cyanide gas, are produced as a result of the burn out step, which is not desirable from the view point of environmental protection. Furthermore, because the foam material is burnt out of the sand mold as the hot metal is poured in, contraflow of the molten metal and burn off products can cause impurities or voids in the cast metal. If the flow of the hot metal into the sand mold is too slow the metal can form localised relatively cool areas of skin and, therefore, not all of the foam material of the casting model may be burnt off, leaving impurities in the casting. If the flow of hot metal is relatively fast, as would be required to reliably ensure that all of the foam material is burnt off for large casting models, waves can be produced in the flowing material, causing it to flow over as it sets, leading to the formation of voids in the cast material. In practice, the formation of these impurities or voids is a limiting factor in the size of low density foam casting model which can be used. Also, as will be appreciated, the moldings and when compacted about the foam casting model, will flow into and fill the cellular cavities of the foam material which extend to the surface of the casting model. The surface of the sand mold at the sand/foam interface is therefore of relatively coarse texture and this surface is exposed when the foam of the casting model is burnt off. In view of the above, castings produced by the use of such low density foam casting models have a relatively poor surface finish which can require substantial localised 'dressing' and general surface machining before being suitable for use in product manufacture. Additionally, if the actual casting is found to include impurities, air bubbles, or similar defects, causing weak points in the cast structure, the casting process has to be repeated. However, as the casting model has been destroyed by the actual casting process, a further casting model must be produced, with the attendant delays and additional costs to the overall process.

A further major disadvantage is that the low density foam model tends to deform when the molding sand is rammed against it.

The degree of deformation is non-uniform and can be relatively difficult to predict. If the shape is for use in manufacturing a high precision mold, additional tolerances must be allowed for in the cast shape, with the surplus material, which typically can be as much as 20 mm in thickness, being removed by a suitable machining technique. For 'male' shapes the deformation of the casting model can be critical as there may be insufficient material in the actual cast shaper, i.e. the casting produced may be undersized, necessitating a repeat of the entire casting process, including the reproduction of the foam casting model.

The relative ease with which low density plastics foam can be deformed means that the material is unsuitable for use when the sand mold is relatively large and is therefore produced by high density ramming techniques in order to provide sufficient inherent strength to support the cast material.

In practice, therefore, low density foam casting models are limited to the production of relatively small items, typically having dimensions not exceeding 300 mm, such as automobile engine water pump housings.

In order to improve the deformation resistance of low density foam casting models it has also been considered to provide the foam material with a surface coating of relatively rigid material which may be applied, for example, by spraying. However, the coating does not provide sufficient rigidity for larger foam casting models as the foam material tends to collapse beneath the casting. Reinforcing structures, made of wood for example, may be used for incorporation into the foam material to minimise deformation during the compaction process. However, the composite wood/foam casting model is relatively difficult to produce and does not provide uniform rigidity.

Hence, such low density plastics foams are considered unsuitable for use in casting processes using relatively heavy metal alloys, such as zinc alloy, which, for large castings, would require inherently strong sand molds to support the cast material both during actual casting and during cooling down of the cast material. In particular, for zinc alloy the cooling down is usually performed under controlled conditions and over a relatively large period of time to ensure a high quality casting, so inherent strength in the sand mold is of paramount importance.

Additionally, as the low density foam is a relatively soft cellular material, it is difficult to machine with reasonable accuracy and surface finish by conventional rotary cutter machining techniques, for example by NC milling. The foam material tends to distort in front of the machine cutter, causing the material to tear away instead of cutting away cleanly, leaving an irregular finished surface with surface cavities. These difficulties in machining low density foam, coupled with the unpredictable compaction during the subsequent casting mold production process, means that NC data representative of the article to be manufactured would not be used in the production of a low density foam casting material. Such low density models are usually made by cutting and shaping by hand, using templates to achieve the final shape. However, as will be appreciated, the accuracy achievable is severely restricted. The above factors can add significantly to the overall cost of the casting process. Furthermore, because the NC data is not used in the production of the low density foam casting model, the data cannot be verified until a subsequent and more critical stage of the overall production process, for example, the machining of expensive graphite electrodes for use in electrical discharge machining (EDM) of the cast material.

SUMMARY OF THE INVENTION

In one aspect, therefore, the invention provides a method of making a forming tool in which a tool blank is cast and the blank is subjected to certain EDM operations.

Preferably the tool blank is cast by (a) making a casting model by machining a rigid foam body, so as to form a machined surface of a predetermined shape on the body, and applying to the machined surface a flowable material which sets to form a solid coating blocking pores in the machined surface; (b) forming a casting mold against the solid coating of the casting model; (c) removing the casting model from the casting mold; (d) casting material into the casting mold; and (e) separating the cast material from the casting mold.

In another aspect a tool blank is subjected to rapid EDM to produce a coarse tool, which is then subjected to slow EDM.

More specifically, the invention provides a method of making a forming tool having an operative surface of a predetermined shape, comprising the sequential steps of (a) subjecting a tool blank to EDM using a first electrode having an operative surface whose shape is complementary to said predetermined shape and which is spaced from the tool blank by a first EDM gap arranged to effect comparatively rapid EDM of the tool blank, thereby to produce a tool having a coarse surface whose shape approximates said predetermined shape; and (b) subjecting said tool to EDM using a second electrode having an operative surface whose shape is complementary to said predetermined shape and which is spaced from said tool by a second EDM gap, the second gap being smaller than the first gap and being arranged to effect comparatively slow EDM of said tool, thereby to produce from the coarse surface an operative surface whose shape is complementary to that of the second electrode.

In a preferred aspect NC data derived from a tool design is used for NC machining of a casting model and NC machining of an EDM electrode.

BRIEF DESCRIPTION OF THE DRAWINGS

The invention will be described further, by way of example only, with reference to the accompanying drawings, in which:

FIGS. 7a and 7b are diagrammatic cross-sections illustrating the surface condition of workpieces after rapid and slow EDM respectively; and FIG. 8 is a diagram illustrating comparative tests of EDM.

DETAILED DESCRIPTION OF THE INVENTION

Figure 1:
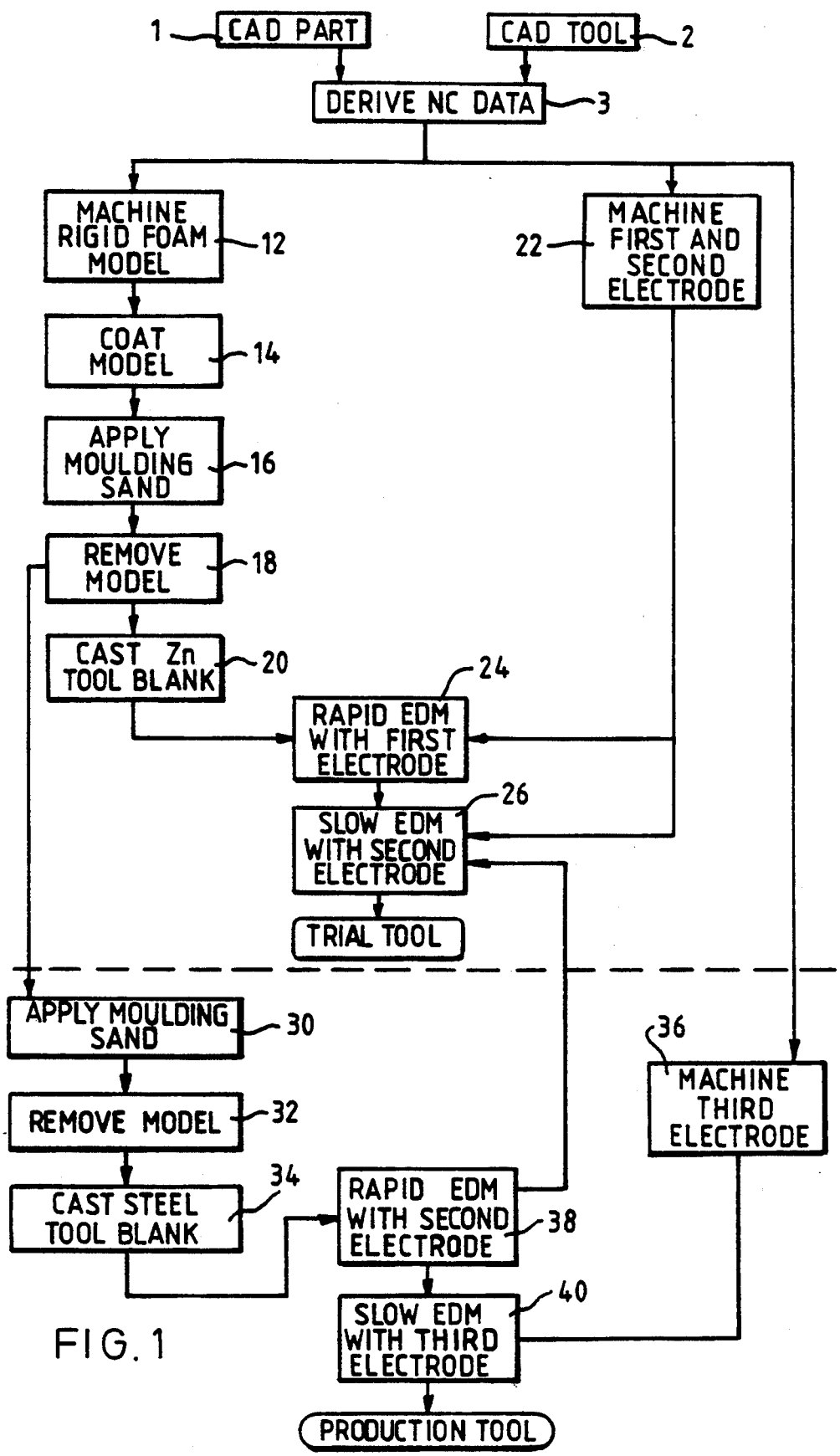
FIG. 1 is a flow chart of a preferred procedure for making a trial tool and, subsequently, a production tool on the basis of CAD data defining the shape of a part to be manufactured by injection molding.

In the procedure illustrated in FIG. 1 a trim part is designed, using CAD, at step 1, and a corresponding injection molding tool is designed, using CAD, at step 2.

At step 3 NC data is derived from the CAD data defining the surface shape of either the part or the tool.

At step 12 a body of rigid plastics foam, in particular a virtually non-deformable high density rigid foam, such as polyurethane resin foam available from CIBA GEIGY under specification No. XB 5120, which has been blocked up by hand to an approximate model shape, by building up layers of the foam material, so as to minimise subsequent machining, is subjected to NC machining in accordance with the NC data from step 3, in order to form a casting model with a machined surface of a predetermined shape.

Because of the inherent characteristic of the foam material, machining work is substantially easier, compared with wood or resin materials and yet the rigid foam material does not distort or tear away, during machining, like conventional low density or soft foam. Such rigid foams are used as a light weight modelling material and are available in a number of grades having, typically, a density in the range of about 0.25 to 1.1 gm/cm$^3$ and a compressive strength greater than about 4 N/mm$^2$, e.g. 4 to 30 N/mm$^2$.

As will be apparent from the following description, the casting model is to be used to produce a mold body which, in turn, is used to produce a cast tool preform. The production of a tool from a cast preform minimises production costs because, with accurate control of the casting process, subsequent machining to provide the finished tool can be kept to a minimum.

At step 14 a settable flowable material is applied to the machined surface of the model, e.g. by spraying. The flowable material sets to form a solid coating which can be smoothed if necessary by sanding and which blocks the pores which remain exposed after the machining of the foam body. A suitable material is plaster of Paris, paint, or a curable resin (e.g. an epoxy or car body resin). A plaster or resin coating may additionally be coated with a varnish or paint to aid release from the sand mold. The coating is supported by the foam body and can therefore be thin and need not be self-supporting.

At step 16 molding sand of a flowable consistency, e.g. a slurry or a sand/resin mixture, is rammed against the coated surface of the casting model in a frame, in order to form a mold body conforming to the coated surface. As will be realised from the following description, the preferred material for the forming tool is zinc alloy in view of its advantageous machining properties. However, zinc alloy is a relatively heavy material and it is important, therefore, for the mold body to withstand the zinc alloy without fracturing, both during the actual casting step and during cooling of the cast material. For this reason high density ramming of the sand/resin mixture is performed using, for example, pneumatic ramming tools, e.g. operating at a pressure of about 80 p.s.i. (0.55 MPa), in order to ensure sufficient compaction of the sand/resin mixture to provide the required strength in the mold body. Hence, a high density rigid foam is chosen to produce the casting model, as it is able to withstand the ramming step without consequential deformation or compaction, as would be apparent if usual casting model foams of relatively low density, such as STYROFOAM (trade mark), were used. The casting model is therefore particularly suited to the production of sand molds for casting relatively large shapes, and in particular, for the casting of articles in heavy alloys, such as zinc alloy.

At step 18 the casting model is removed from the mold body. Removal is facilitated by the smooth coating, which parts easily from the mold body and does not tend to carry away grains of sand with it. Consequently, the surface of the mold body is comparatively smooth and produces a good surface finish on the casting. Since the coating is firmly anchored in the pores of the model, the model can be re-used to reproduce the mold body if the casting is subsequently found to be defective. Additionally, since the model is removed before a tool blank is cast in the mold, no toxic fumes are generated during casting. Furthermore, owing to the inherent rigidity of the foam material, the model is able to withstand repeated removal from the mold body without cracking or damage, even though it does not possess inner reinforcement, such as a wooden reinforcing structure, as would be required for soft foam materials.

FIGS. 2 to 6 illustrate successive stages in the making of a casting mold for casting a female cavity tool blank and a male core tool blank which are subsequently to be machined to form a pair of injection molding tools.

Figure 2:
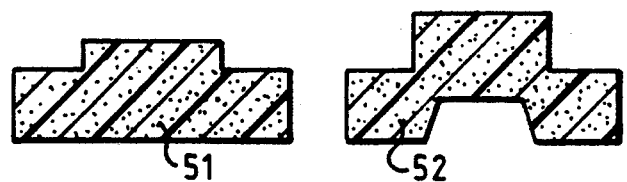
FIGS. 2, 3, 4, 5 and 6 are diagrammatic cross-sections illustrating various successive stages in the making of a casting mold for casting a pair of male and female injection molding tool blanks.

As described above, first of all, to produce casting models, a female blank block 51 and a male blank block 52 are built up from layers of rigid high density plastics foam (FIG. 2).

Figure 3:
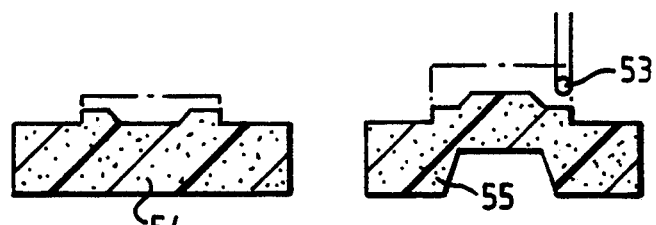

In FIG. 3 the blocks are subjected to the NC machining (using a cutting tool 53) to form female and male blank casting models 54,55 (step 12 above). The blocks are machined so as to leave excess material (e.g. 1 to 5 mm) over the surfaces corresponding to the forming and shut faces of the injection molding tools.

Figure 4:
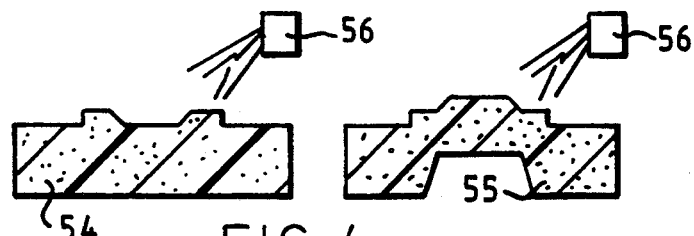

In FIG. 4 settable material is applied to the models 54,55 by spray heads 56 (step 14 above).

Figure 5:
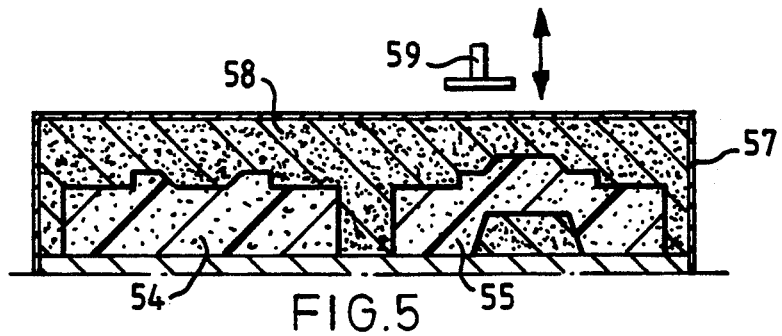
Figure 6:
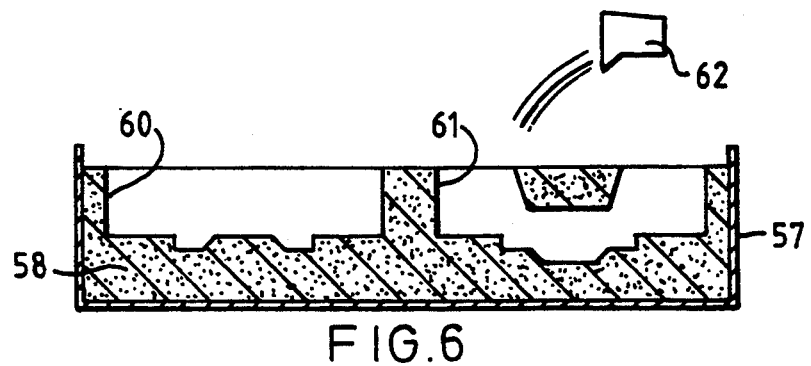

In FIG. 5 the coated models 54,55 are placed in a casting frame 57, and green sand 58 (mixed with a resin binder) is added and is compacted to a high density by a pneumatic rammer 59 (step 16 above).

The casting frame 57 is then turned over and the models 54,55 are carefully removed from the compacted sand 58 (step 18 above), leaving a female tool blank casting cavity 60 and a male tool blank casting cavity 61, into which cavities a molten metal (Zn alloy) is to be cast from a ladle 62.

Referring back to FIG. 1, at step 20 a tool blank approximately to the desired shape of the tool is cast using the mold body from step 18. The blank is, advantageously, cast in a zinc alloy (Zn-Al-Pb), e.g. containing 92–98 wt. % Zn, such as that sold under the trade name KIRKSITE or KAYEM. Zinc alloy castings have an advantage in that they exhibit reduced microporosity in comparison to castings of aluminum alloy. This is thought to arise from the lead content in the material which remains fluid to a lower temperature than the other constituents and therefore flows into and fills microporous holes in the material as it is cast. Also, they can easily be recycled, and, as will be realised from the following description, it has been found that they can be machined very rapidly to a desired shape using EDM.

At step 22 the same NC data from step 3 is used in machining at least two EDM electrodes, preferably of graphite.

The machining of the casting model using the NC data is particularly advantageous when the foam model is to be used in a forming tool production process using EDM, as the NC data (part data), by its use in machining the casting model, can be used to verify the NC data for the production of EDM electrodes before actual machining of the relatively expensive electrode materials, such as graphite. The use of NC machining also means that an allowance can easily be made to accommodate the contraction that the cast metal is subject to, after casting and on cooling.

The high density rigid foam material can be machined relatively accurately and, as it does not suffer from compaction during step 16, it can be machined almost exactly to the dimensions of the article to be formed. Hence the NC machining datum modification can be reduced to the absolute minimum in step 12. Even for large casting models, such as for use in the production of a vehicle impact bumper, it is possible that the casting made by using the rigid foam can be accurate to within 1 mm, so the NC machining datum adjustment can be reduced to this figure (in practice this can be achieved very simply by using the same NC data as the part shape but changing the diameter of the cutting tool used). As explained above, when normal low density casting foams are used, at least 20 mm is, typically, required as surplus cast material to compensate for compaction, even for the relatively small articles for which the low density casting models can be used.

Furthermore, as the rigid foam can be accurately machined, the shut faces of the injection molding tool can be accurately defined in the foam casting model. For injection molding tools a 30 mm shut face width is normally the accepted minimum and this can be achieved using the rigid foam. (For "Styrofoam" casting models, the shut faces have not normally been defined and hence, when EDM is to be used on the subsequent cast shape, the entire mating surfaces of the tool would have required machining. Alternatively, further NC data would have been required to define the shut faces by NC machining.) Minimising the width of the shut faces is particularly important for EDM as the machining rate is determined by the volume of material to be removed. Therefore, the rigid foam not only permits the use of a foam casting model for relatively large molds but also enables the advantages of subsequent EDM to be maximized as not only is there a substantial reduction in the depth of material to be removed in the casting (1 mm as compared with 20 mm) but there is also a reduction in the surface area of the material to be machined.

The ability to machine a relatively rigid foam in the above manner thus enables an injection molding tool to be cast in such a way that the area on the tool to be finished by a subsequent machining process is reduced to a minimum, such as the machining of a shut face frame of the injection molding tool and the finish machining of any cavity and core slide faces.

At step 24 a first one of the EDM electrodes is used for comparatively rapid machining of the cast tool blank (from step 20) to produce a coarse tool having a relatively coarse surface finish requiring further machining.

At step 26 a second one of the EDM electrodes is used for comparatively slow or normal machining of the coarse tool to the required dimensions.

In EDM, the upper limit of the gap between the electrode and the workpiece (usually known as the EDM gap) has been generally accepted to be 0.4 mm. If gaps above this limit are used, the surface roughness of the machined part would usually be considered unacceptable for practical use.

However, the rapid EDM in step 24 uses machine settings which provide an EDM gap above this figure. As can be understood more clearly from the subsequent description, the provision of this exceptionally wide gap produces a great improvement in EDM machining time. One of our test results shows that, when machining zinc alloy, for example, rapid EDM using a 0.68 mm gap is more than 100 times faster than normal EDM using a typical gap width of 0.073 mm.

Although the use of such an exceptionally large EDM gap results in a coarse or pitted surface which in a conventional EDM procedure would be considered damaged or unsuitable as a finished surface for an injection molding tool, this will not be a problem under the present procedure because the rapid EDM (step 24) is only continued to a stage where the coarse surface can still be recovered to the required dimensions by slow or normal EDM (step 26).

In step 26, because the coarse tool is near to the desired dimensions, the amount of subsequent machining required by slow or normal EDM (in order to recover the coarse surface to a usable surface of the required dimensions) is reduced to a minimum. The slow EDM need only take a relatively short time and results in a surface finish which can have a very low roughness suitable for an injection molding tool.

FIG. 7a schematically shows the surface condition of a workpiece after rapid EDM and FIG. 7b shows the surface condition of the same workpiece after slow EDM. The rapid EDM enables speedy erosion but leaves a coarse and pitted surface S, as seen in FIG. 7a, and the surface of the first electrode also becomes worn and coarse during this EDM operation, which is not suitable for finish machining. This workpiece surface is cut off to a depth d (e.g. 1 mm) through slow EDM using a second electrode, leaving a smooth surface S' (FIG. 7b) which is suitable as a finished surface for the article.

It has surprisingly been found, in particular, that if zinc alloy is used as the material for the workpiece and the EDM gap is increased beyond 0.4 mm, then the rate of removal of material using rapid EDM (for approximately the same surface finish) is much improved for zinc alloy in comparison with the other materials which might be considered in making injection molding tools (in particular aluminum alloy and steel). Tests have been carried out by machining recesses using EDM in blocks B of steel, aluminum alloy, and zinc alloy, with rectangular graphite electrodes E, as diagrammatically illustrated in FIG. 8, using rapid and slow (normal) EDM, with the following results:

| material | Slow EDM | | | Rapid EDM | | |
|---|---|---|---|---|---|---|
| | Steel | Al | Zn | Steel | Al | Zn |
| duration, t | 35 h 04 | 11 h 13 | 7 h 56 | 1 h 58 | 41 min | 4 min |
| L, mm | 20.20 | 20.15 | 20.18 | 21.05 | 21.80 | 21.20 |
| W, mm | 20.10 | 20.10 | 20.05 | 20.10 | 20.10 | 20.10 |
| L − W, mm | 0.10 | 0.05 | 0.13 | 0.95 | 1.70 | 1.10 |
| roughness, $R_a$, μm | 3.04 | 3.43 | 4.06 | not measurable (coarse and pitted) | | |
| t(slow)/ t(rapid) | 17.83 | 16.41 | 119.00. | | | |

It can be seen from these results that, when the abnormally large EDM gap is used, for zinc alloy there is an approximately eight-fold improvement in material removal when compared with aluminum alloy, a material of roughly the same hardness. It was also found that much more even sparking could be achieved with zinc alloy when compared with aluminum alloy.

In practice the actual rates of removal of material during rapid and slow EDM will also depend on the current which may be delivered by the EDM machine used. Furthermore, it has also been found that the rate of removal of material in step 24 may be approximately doubled by changing the polarity of the graphite electrode from positive to negative. Electrode wear is (as expected) dramatically increased in this case, typically by as much as 25 to 35 times, dependent on the machine settings used, which could impair the dimensional accuracy of the finished tool if adopted for finish machining. However, in the tool production process being described here, this increased electrode wear can be tolerated since the first electrode is used only to rough machine the tool blank and is not critical to the ultimate quality of the tool produced.

The gap between the electrode and workpiece for coarse EDM may, in the present process, be 0.5 mm or more (and only limited by machine power) whereas the gap for fine EDM may be less than 0.5 mm.

As mentioned above, irregular sparking between the electrode and workpiece occurs when machining aluminum alloy and it has been found that this irregularity increases dramatically with increase in processing speed, i.e. increase in EDM gap. As a result of this irregular sparking, unless the coarse machining is carefully controlled, it is possible to produce a surface roughness which is not recoverable by the finish EDM process. The use of zinc alloy, therefore has been found particularly advantageous as it allows the rapid EDM at the abnormally large EDM gap to be maximised, thereby minimising the relatively slow finish machining required, reducing the overall production cost.

In automotive design, for example, injection molding is used to produce many of the exterior body parts and interior trim panels. In view of the interaction between many of these parts, as well as the size and complexity of the designs, many designs are proved for their intended use by testing. This is achieved by making trial parts using trial injection molding tools. As the number of trial parts required is relatively small, the trial tools are usually made from a relatively soft alloy, such as aluminum alloy. Once the trial parts are proven, both aesthetically and functionally, a production tool is made to the desired final shape in a more durable material such as steel, to account for the large production runs required for the parts.

The product of step 26 is a tool which, after an optional polishing step, can be used in the trial production of injection molded parts, i.e. a trial tool as described above. Subsequent to this trial, a production tool of steel (or another suitable material, depending upon the use of the tool, including aluminum alloy or zinc alloy) can made by the following procedure.

At step 30, molding sand is rammed against the coated surface of the casting model (from step 18) in a frame, in order to form a mold body. At step 32 the model is removed from the mold body. At step 34 a further tool blank is cast, preferably of steel, using the mold body from step 32, and ultimately can be used as a production tool.

At step 36 a third EDM electrode, again preferably of graphite, is machined, using the same NC data (from step 3) as in steps 12 and 22 or a derivative of that data if there is a design change after the trial tooling.

At step 38 the second EDM electrode (used in step 26) is used for rapid machining of the cast steel tool blank (from step 34) to produce a coarse tool. This (second) EDM electrode has only become slightly worn during the EDM to produce the trial tool, because the EDM was slow and the processing time was relatively short. Therefore, the re-use of the second EDM electrode for rapid EDM in production tooling is feasible and economical.

At step 40 the third EDM electrode (from step 36) is used for slow final machining of the coarse tool to the required dimensions, thereby to produce the production tool.

It will be appreciated that each individual step described above may be replaced by a different step having a similar effect. In particular, advantages are provided by the following features, the use of an exceptionally large electrode gap for rapid EDM and a smaller electrode gap for slow or finish EDM;

the use of reverse polarity to further enhance the removal of material by rapid EDM;

the use of two discrete electrodes of the same or similar shape for rapid and slow EDM;

the use of the same EDM machine with the same dielectric fluid (oil) for rapid and slow EDM;

the use of the second electrode (used in the production of a first tool) as the first electrode in the subsequent making of a second tool;

the use of only three electrodes in the making of a trial tool and a production tool;

subjecting a precision casting to finishing by EDM;

the use of a machined re-usable foam body as a casting model (i.e. the use of the same casting model in the production of a trial tool and a production tool), followed by EDM;

the use of a tool blank made, preferably by casting, of zinc alloy in a two-stage EDM process.

In the procedure specifically described above, the use of a number of NC machining operations and casting makes the workflow tolerant to part design change. The use of NC machining as described also reduces manpower requirements and increases NC machine utilisation. Furthermore, the use of EDM enhances surface quality and dimensional accuracy.

It will be appreciated, in particular, that in the manufacture of trial and production tools, such as are in common use in the automotive industry, minor design changes can easily be accommodated between the production of any two electrodes for use in the overall process. This is considered particularly advantageous in the design and manufacture of automotive trim and body parts, as it provides maximum flexibility in the overall design/manufacturing process at minimal cost. The rigid foam casting model, being retained after the first casting process, i.e. to produce the development tool, can be used to produce the production tool. If a design change is required, the NC data so produced can immediately be used to modify the foam master or casting model and for the electrodes used in the EDM process. This flexibility may be implemented at any stage of the tool production process, for example either between the two electrodes used to produce the first or trial tool, or between the trial and production tools, and can be accommodated relatively easily in view of the easy working of the foam material (in comparison with wood or resin structures), the use of the NC data to machine the casting model, and the provision of a plaster, curable resin, or paint coating. By using this NC data to modify the foam model, the data can, as with the original design data, be proven by modifying the foam model before machining of the relatively expensive electrode material.

Furthermore, although the above description refers to a number of electrodes, it should be realised that all of the electrodes, dependent on the shape of the tool required, may be fabricated from a common block of graphite, further reducing the tool production costs. The electrodes used will include a shaped portion conforming to the shape of the required part, extending from a body portion which, in effect, only serves to support the shaped portion effective in the EDM process. Hence, by selecting a graphite block of appropriate size, the first electrode, for example, when worn through the relatively coarse machining of the first tool, can be remachined, using either the original or modified NC data, to provide either the original or a similar profile (incorporating possible design changes), which can act as any or all of the subsequent electrodes. Although the overall production time may be increased slightly, the amount of graphite used is kept to a minimum.

In forming a part by injection molding, a female cavity tool is used in conjunction with a male core tool to define the molding cavity. The female cavity tool defines the primary surface of the part, which surface is to be exposed in use; the female cavity tool defines a generally concave molding surface. Since the male core tool only defines the secondary surface on the injection molded part, it can if desired be made by conventional NC machining, and finishing is not necessary, except around the parting face.

Although a two-stage EDM process has been particularly described, it should be realised that a larger number of EDM steps can also be used. For example, two or more electrodes may be employed sequentially in either the coarse machining or the fine machining of the cast material.

What is claimed is:

1. A method of making forming tools having an operative surface of a predetermined shape, comprising the sequential steps of:
   (a) subjecting a tool blank to EDM using a first electrode having an operative surface whose shape is complementary to said predetermined shape and which is spaced from the tool blank by a first EDM gap arranged to effect comparatively rapid EDM of the tool blank, thereby to produce a tool having a coarse surface whose shape approximates said predetermined shape;
   (b) subjecting said tool to EDM using a second electrode having an operative surface whose shape is complementary to said predetermined shape and which is spaced from said tool by a second EDM gap, the EDM second gap being smaller than the first EDM gap and being arranged to effect comparatively slow EDM of said tool, thereby to produce from the coarse surface an operative surface whose shape is complementary to that of the second electrode;
   (c) subjecting a further tool blank to EDM using the second electrode, which is spaced from the further tool blank by an EDM gap arranged to effect comparatively rapid EDM of the further tool blank, thereby to produce a further tool having a coarse surface whose shape approximates to said predetermined shape; and
   (d) subjecting said further tool to EDM using a third electrode having an operative surface whose shape is complementary to said predetermined shape and which is spaced from said further tool by an EDM gap arranged to effect comparatively slow EDM of said further tool, thereby to produce from the coarse surface an operative surface whose shape is complementary to that of the third electrode.

2. A method as claimed in claim 1, in which the first EDM gap is at least 0.5 mm and the second EDM gap is less than 0.5 mm.

3. A method as claimed in claim 1, in which the first electrode is of negative polarity in step (a) and the second electrode is of positive polarity in step (b).

4. A method as claimed in claim 1, in which the tool blank is made of zinc alloy.

5. A method as claimed in claim 1, in which the tool blank comprises a casting having a surface whose shape approximates to said predetermined shape.

6. A method as claimed in claim 5, in which the tool blank is produced by a process comprising the steps of
   (a) making a casting model by machining a rigid foam body, so as to form a machined surface whose shape approximates to said predetermined shape on the body;
   (b) forming a casting mold against the casting model;
   (c) removing the casting model from the casting mold;
   (d) casting material into the casting mold; and
   (e) separating the cast material from the casting mold.

7. A method as claimed in claim 6, including applying to the machined surface a flowable material which sets to form a solid coating blocking pores in the machined surface.

8. A method as claimed in claim 7, in which the flowable material is selected from the group consisting of plaster of Paris, paint, and resin.

9. A method as claimed in claim 7, further comprising smoothing the coating before step (b).

10. A method as claimed in claim 7, further comprising painting or varnishing the coating before step (b).

11. A method as claimed in claim 6, in which the casting mold comprises a mixture of sand and resin.

12. A method as claimed in claim 6, in which the casting mold is formed using high density ramming.

13. A method as claimed in claim 6, in which the rigid foam body has a density of at least 0.25 g/cm$^3$.

14. A method as claimed in claim 6, in which the rigid foam body has a density in the range from 0.25 to 1.1 g/cm$^3$.

15. A method as claimed in claim 6, in which the rigid foam body has a compressive strength of at least 4 N/mm$^2$.

16. A method as claimed in claim 6, in which the rigid foam body has a compressive strength in the range from 4 to 30 N/mm$^2$.

17. A method as claimed in claim 6, in which the rigid foam body comprises a polyurethane resin based foam material.

18. A method as claimed in claim 6, in which the casting model body is produced by NC machining using predetermined NC data derived from said predetermined shape.

19. A method as claimed in claim 18, in which at least one of the electrodes is produced by NC machining using said predetermined NC data or a derivative thereof.

20. A method as claimed in claim 1, in which the second electrode is produced from data which is modified from data used to produce the first electrode.

21. A method as claimed in claim 1, in which the further tool blank is made of a metal selected from the group consisting of steel, zinc alloy, and aluminum alloy.

22. A method as claimed in claim 1, in which the first-mentioned tool is a trial tool and the further tool is a production tool.

23. A method as claimed in claim 1, in which the first-mentioned tool blank is produced by a process comprising making a casting model by machining a rigid foam body so as to form a machined surface whose shape approximates to said predetermined shape, forming a casting mold against the casting model, removing the casting model from the casting molds and using the casting mold to cast the tool blanks and in which the further tool blank is produced by casting using the said casting model.

24. A method as claimed in claim 1, in which the third electrode is common in size and shape to the second electrode.

25. A method as claimed in claim 1, in which the EDM gap in step (c) is at least 0.5 mm and the EDM gap in step (d) is less than 0.5 mm.

26. A method as claimed in claim 1, in which the second electrode is of negative polarity in step (c) and the third electrode is of positive polarity in step (d).

27. A method as claimed in claim 1, in which at least one of the electrodes is made of graphite.

28. A method as claimed in claim 1, in which the second electrode is common in size and shape to the first electrode.

29. A method as claimed in claim 1, in which the third electrode is produced from data which is modified from data used to produce the second electrode.

30. A method of making a forming tool having an operative surface of a predetermined shape, comprising the sequential steps of:
(a) subjecting a tool blank to comparatively rapid EDM using a first electrode, said first electrode having a shape that is complementary to said predetermined shape, said electrode being spaced from the tool blank by a first EDM gap, thereby producing a tool having a coarse surface whose shape approximates said predetermined shape; and
(b) subjecting said tool to comparatively slow EDM using a second electrode, said second electrode having a shape that is complementary to said predetermined shape, said second electrode being spaced from said tool by a second EDM gap, said second EDM gap being smaller than said first EDM gap, thereby producing from said coarse surface an operative surface whose shape is complementary to that of the second electrode.

* * * * *